Dec. 25, 1951     L. LEE, II     2,580,030
PRESSURE REGULATING APPARATUS
Filed March 24, 1945
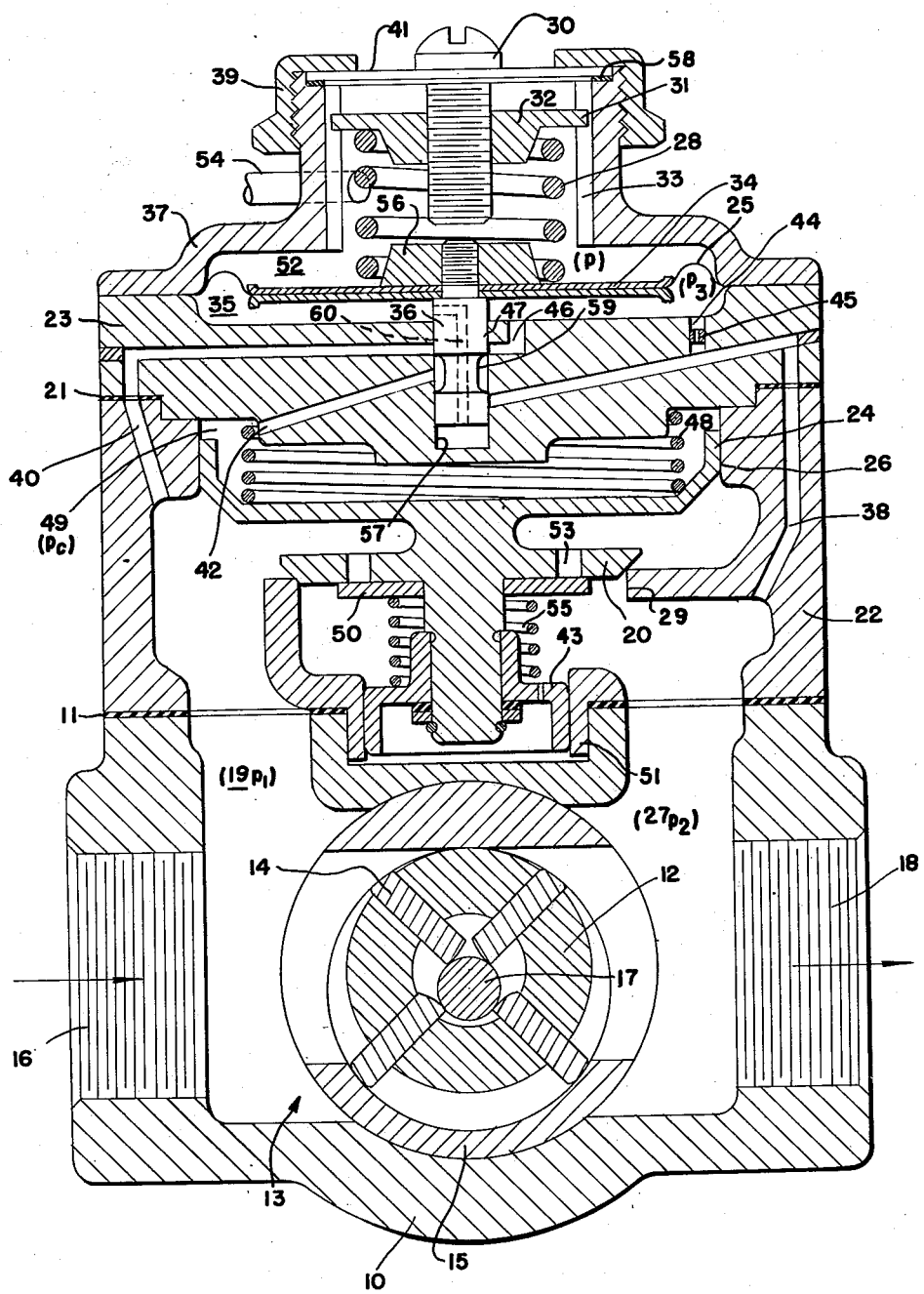
INVENTOR.
LEIGHTON LEE II
BY
Lester W Clark
AGENT Patented Dec. 25, 1951

2,580,030

UNITED STATES PATENT OFFICE 2,580,030

PRESSURE REGULATING APPARATUS

Leighton Lee, II, West Hartford, Conn., assignor, by mesne assignments, to Niles-Bement-Pond Company, West Hartford, Conn., a corporation of New Jersey Application March 24, 1945, Serial No. 584,554

14 Claims. (Cl. 103—42)

This invention relates to pressure regulating means for pumps and particularly to means for maintaining a constant discharge pressure.

A primary object of the invention is to provide means for maintaining the discharge pressure of the pump, such as the fuel pump for an aircraft engine, constant, regardless of the quantity of fluid being delivered.

Another object of the invention is to control the discharge pressure of a pump from minimum to maximum flow by slightly varying the loading of the relief valve, fluid from the discharge side of the pump being admitted for that purpose to a cylinder within which a piston connected to the relief valve operates.

Another object of the invention is to maintain the relief valve for the pump closed by regulating pressure acting against a piston forming part of the relief valve, the pressure against the piston being controlled by movements of a pilot valve mounted on a flexible diaphragm to open and close connections to the discharge and intake passages of the pump.

Another object is to provide an inmproved means for making the discharge pressure of the pump equal to a control pressure.

With the above and other objects in view, my invention may include the features of construction and operation set forth in the following specification and illustrated in the accompanying drawing.

In the drawing, the figure is a longitudinal section taken centrally through a fuel pump having the present invention applied thereto.

Briefly, and in its broadest aspect, the invention may comprise the following principal parts: First, a pump; second, a relief valve therefor connected to the movable wall of an expansible chamber motor; third, a spring acting on said wall to bias said relief valve closed; fourth, a pilot valve for selectively admitting fluid under pressure to said chamber and relieving the pressure therein; fifth, a diaphragm subject to the pump discharge pressure for actuating said pilot valve, and sixth, adjustable means acting on said diaphragm in opposition to said pressure to control the valve of pressure maintained.

Referring more in detail to the figure of the drawing, there is shown a rotary pump of a conventional type having a casing 10 within which rotates a rotor or impeller 12 provided with a plurality of radially movable vanes 14. The casing 10 also has an intake passage 16 on one side of the impeller and a discharge passage 18 on the other, these spaces being connected by passages 19 and 27 within which is a relief valve 20. The relief valve 20 is mounted within a valve casing 22, which is secured to the pump casing 10 in fluid tight relation by means not shown.

The relief valve 20 operates against a seat of conventional shape and size and is provided with a cylindrical surface 24 of somewhat greater diameter. This cylindrical surface 24 forms a piston and operates within a cyinder 26 formed in the casing 22 for the relief valve 20. The cylinder 26 and piston 24 form an expansible chamber 49. Controlling the discharge pressure of the pump is a spring 28, the force of which may be varied in the usual manner by adjustment of a screw 30. One end of the spring 28 bears against a collar 32 movable by rotation of the adjusting screw 30 and the opposite end presses against a flexible diaphragm 34. The collar 32 has two diametrically opposite lugs 31 which slide in grooves 33 in the cover 37 of the value housing. These lugs prevent rotation of collar 32. A cap 39 is provided to lock a flange 41 on the screw 30 against the cover 37 so as to hold the collar 32 in any selected position.

Mounted for movement with the diaphragm 34 is a pilot valve 36 preferably of the spool type operating within a central opening within the valve casing 22. The valve 36 operates to connect a conduit 42 leading to the chamber 49 selectively with conduits 38 and 40 leading respectively to the outlet and inlet of the pump. A conduit 44 having a constriction therein leads from discharge pressure conduit 38 to the chamber 35 below the diaphragm 34. Another conduit 46 leads from chamber 35 to a port 47 in the seat of valve 36. Also mounted within the chamber 49 is a helical spring 48 normally urging the piston 24 downward to move the relief valve 20 toward closed position and supplementing the pressure within the chamber 49 acting on the piston 24.

The relief valve 20 may have a by-pass valve 50 of conventional type in the form of a spring pressed disc bearing against the lower surface of the relief valve 20. The valve 20 is provided with openings normally closed by the disc 50 so that fluid can be pumped past this valve should the pump fail to operate.

With the pump discharging fluid at a selected pressure determined by adjustment of spring 28 the pilot valve 36 will be disposed in its central or neutral position and the conduits 38, 40, and 46 will be closed by the heads formed on the pilot valve.

Fluid within the space below the diaphragm 34 will be maintained at the discharge pressure by conduit 44. When a slight variation in discharge pressure occurs, the diaphragm 34 will move slightly and correspondingly move the valve 36. If the discharge pressure is slightly increased, its effect will be to increase the pressure below the diaphragm 34 and slightly raise the diaphragm and the pilot valve 36. This upward movement of the pilot valve 36 opens communication from conduit 42 past the pilot valve 36 to conduit 40 leading to the inlet passage of the pump. Simultaneously the valve 36 also opens conduit 46 past the valve to conduit 40, thus permitting some fluid below the diaphragm 34 to drain into the intake. This causes a temporary reduction in pressure in chamber 35. This slightly reduces the pressure acting on the piston 24 of the relief valve 20 and permits this valve to open wider under the influence of the discharge presure acting on its lower face, thereby reducing the discharge pressure. If the pressure within the discharge passage 18 of the pump decreases slightly, the force of spring 28 will move the diaphragm and valve 36 slightly downward and open communication by conduits 38 and 42 between discharge passage 18 of the pump and the chamber 49 within which piston 24 operates. This will admit fluid at discharge pressure to this space and increase the pressure acting on the piston 24 of the pilot valve 20 so that the relief valve moves toward closed position, thereby increasing the discharge pressure. As soon as the discharge pressure in passage 18 has been restored to the predetermined pressure the diaphragm 34 and the valve will be returned to neutral or central position.

The pump discharge pressure may also be controlled by supplying a variable fluid control pressure to the chamber 52 above the diaphragm 34 thru a connection illustrated at 54. If the pump discharge pressure is thus controlled, the spring 28 may be omitted, if desired.

In previous pressure regulating relief valves for pumps, it has been customary to connect the adjustable control spring directly to the valve itself. When the relief valve is so arranged, it is necessary, because of the rate of the spring, for the discharge pressure to increase slightly in order to open the valve an additional amount. Therefore, if the pump speed varies over a wide range while the flow remains constant, the pump discharge pressure will likewise vary, although it is said to be nominally constant. This variation of pump discharge pressure with speed at a given flow through the discharge line is termed the "regulation" of the pump.

In the device disclosed in the present application, the regulation of the pump is substantially zero. It may be seen that under steady conditions, the position of diaphragm 34 and spring 28 is the same, regardless of the position of piston 24. Therefore any deviation of the pump discharge pressure from its established value causes an operation of the relief valve, and the pump discharge pressure is returned to exactly the same established value by the operation of the relief valve. Therefore, the regulation of the pump discharge pressure when controlled by a valve of the type illustrated in this application is substantially zero.

I have provided means for preventing the pilot valve 36 from over-shooting or hunting. This means includes a restriction 45 in the conduit 44 leading to the chamber under the diaphragm 34, and the conduit 46.

If the pump discharge pressure increases over the "set" pressure, then the pressure under diaphragm 34 increases, raising the valve 36. The raising of valve 36 opens the passage 46 to the inlet side of the pump and therefore temporarily lowers the pressure in chamber 35, tending to prevent too great a displacement of the pilot valve 36. This, in effect, anticipates the decrease in discharge pressure which results from the operation of the relief valve. As the pump discharge pressure is returned to its desired value, the valve 36 gradually closes. If the restriction 45 is properly designed as to size, then the valve 36 may be made to close exactly when the pump discharge pressure reaches its desired value, without any over-shooting.

It should be noted that the relief valve 20 is not balanced against pump inlet pressure, because of the difference in size of the piston 24 and the valve 20. Since the piston 24 is larger, the pump inlet pressure applies a net opening force to the relief valve. Therefore, if the pump inlet pressure changes for any reason, it tends to cause a movement of the valve. However, the resulting movement of the valve changes the pump discharge pressure and causes the pilot valve 36 to operate so as to restore pump discharge pressure to its previous value. Therefore, it may be seen that variations in pump inlet pressure will not affect the discharge pressure of the pump, even though the relief valve is not balanced to pump inlet pressure. By making the piston 24 larger than the valve 20, more power is available to position the valve 20, so that it is less likely to be effected adversely by sticking between the piston 24 and cylinder 26 or between the guide piston and cylinder located below the valve. Of course, if desired, the relief valve may be designed to be balanced against pump inlet pressure.

While I have shown and described a preferred embodiment of my invention, other modifications thereof will readily occur to those skilled in the art, and I therefore intend my invention to be limited only by the appended claims.

I claim:

1. Apparatus for regulating the pressure at the discharge outlet of a pump, comprising a relief valve for passing fluid from the outlet to the inlet of said pump, fluid motor means for operating said relief valve including an expansible chamber having a movable wall and a connection between said wall and said valve, pilot valve means for controlling said fluid motor means and operable selectively to connect said chamber to the outlet and inlet of said pump and thereby to cause expansion and contraction, respectively, of said chamber, and pressure responsive means subject to said pump discharge pressure for operating said pilot valve means.

2. Apparatus for regulating the pressure at the discharge outlet of a pump, comprising a relief valve for passing fluid from the outlet to the inlet of said pump, fluid motor means for operating said relief valve including an expansible chamber having a movable wall and a connection between said wall and said valve, pilot valve means for controlling said fluid motor means and operable selectively to connect said chamber to the outlet and inlet of said pump and thereby to cause expansion and contraction, respectively, of said chamber, a second expansible chamber, a diaphragm forming a wall of said second chamber, a connection between said diaphragm and said pilot valve means, a passage for supplying said second chamber with fluid at the pump discharge pressure, and a restriction in said passage for delaying transmission of sudden pressure changes to said second chamber to prevent hunting of said motor means.

3. Apparatus for regulating the pressure at the discharge outlet of a pump, comprising a relief valve for passing fluid from the outlet to the inlet of said pump, fluid motor means for operating said relief valve including an expansible chamber having a movable wall and a connection between said wall and said valve, pilot valve means for controlling said fluid motor means and operable selectively to connect said chamber to the outlet and inlet of said pump and thereby to cause expansion and contraction, respectively, of said chamber, pressure responsive means subject to said pump discharge pressure for operating said pilot valve means, and means operatively associated with said pilot valve and effective upon movement thereof in a pump discharge pressure decreasing direction to decrease the pressure acting on said pressure responsive means and thereby subject said pressure responsive means to a pressure varying with, but less than, said discharge pressure, whereby the rate of decrease in said pump discharge pressure is correspondingly reduced.

4. Discharge pressure regulating apparatus for a fluid pump including an inlet thereto, a discharge outlet therefrom, an impeller for causing flow of fluid from said inlet to said outlet, and a relief valve for by-passing fluid thereacross from said outlet to said inlet to control the discharge pressure at said outlet, comprising: first means responsive to said discharge pressure having a neutral position which produces a force acting on said first means proportional to the value of said discharge pressure, said force having a predetermined value when said first means is in said neutral position, and second means responsive to said first means for controlling said relief valve to maintain said first means in said neutral position, whereby said discharge pressure has a value corresponding to said predetermined value of said force.

5. Discharge pressure regulating apparatus for a fluid pump including an inlet thereto, a discharge outlet therefrom, an impeller for causing flow of fluid from said inlet to said outlet, and a relief valve for by-passing fluid thereacross from said oulet to said inlet to control the discharge pressure at said outlet, comprising: first means including a spring and a diaphragm subjected on one face to said spring and a control air pressure, and on its opposite face to said discharge pressure, said means being thus responsive to the force of said spring and control pressure minus the force of said discharge pressure, acting on said diaphragm, the deflection of said spring having a predetermined value when said forces are in equilibrium, and second means responsive to said first means for controlling said relief valve to maintain said spring deflection at a substantially constant value, whereby said discharge pressure varies in a definite selected relation to said control pressure.

6. Discharge pressure regulating apparatus for a fluid pump including an inlet thereto, a discharge outlet therefrom, an impeller for causing flow of fluid from said inlet to said outlet, and a relief valve for by-passing fluid thereacross from said outlet to said inlet to control the discharge pressure at said outlet, comprising: first means including a piston responsive to a regulating pressure applied thereto for regulating said relief valve, and second means responsive to a force applied thereto for varying said regulating pressure to maintain said discharge pressure at a predetermined proportional value of said force.

7. Discharge pressure regulating apparatus for a fluid pump including an inlet thereto, a discharge outlet therefrom, an impeller for causing flow of fluid from said inlet to said outlet, and a relief valve for by-passing fluid thereacross from said outlet to said inlet to control the discharge pressure at said outlet, comprising: a piston movable with said relief valve for control thereof, a cylinder for movement of said piston therein, an expansible chamber formed by said cylinder and said piston for retaining a regulating pressure therein, said piston being responsive to said regulating pressure, conduit means for flowing fluid from said pump outlet to said chamber and from said chamber to said pump inlet, and valve means in said conduit means for selectively permitting flow to and from said chamber in said conduit means so that the value of said regulating pressure is thereby respectively increased or decreased, whereby said discharge pressure bears a definite, predetermined relation to the operation of said valve means.

8. Discharge pressure regulating apparatus for a fluid pump including an inlet thereto, a discharge outlet therefrom, an impeller for causing flow of fluid from said inlet to said outlet, and a relief valve for by-passing fluid thereacross from said outlet to said inlet to control the discharge pressure at said outlet, comprising: a piston movable with said relief valve for control thereof, a cylinder for movement of said piston therein, an expansible chamber formed by said cylinder and said piston for retaining a regulating pressure therein, said piston being responsive to said regulating pressure, conduit means for flowing fluid from said pump outlet to said chamber and from said chamber to said pump inlet, and control means responsive to variations in the value of said discharge pressure for controlling the flow thru said conduit means to control said regulating pressure, whereby said discharge pressure bears a definite, predetermined relation to the operation of said control means.

9. Discharge pressure regulating apparatus for a fluid pump including an inlet thereto, a discharge outlet therefrom, an impeller for causing flow of fluid from said inlet to said outlet, and a relief valve for by-passing fluid thereacross from said outlet to said inlet to control the discharge pressure at said outlet, comprising: a piston movable with said relief valve for control thereof, a cylinder for movement of said piston therein, an expansible chamber formed by said cylinder and said piston for retaining a regulating pressure therein, said piston being responsive to said regulating pressure, conduit means for flowing fluid from said pump outlet to said chamber and from said chamber to said pump inlet, a control valve in said conduit means for selectively permitting flow to and from said chamber in said conduit means so that the value of said regulating pressure is thereby respectively increased or decreased, means including a diaphragm for positioning said control valve, means for subjecting one side of said diaphragm to said discharge pressure, means for applying a predetermined load on said diaphragm in opposition to said discharge pressure so that said diaphragm is responsive to the differential between said load and the force of said discharge pressure acting thereon, whereby said discharge pressure bears a definite, predetermined relation to said load.

10. Discharge pressure regulating apparatus for a fluid pump including an inlet thereto, a discharge outlet therefrom, an impeller for causing flow of fluid from said inlet to said outlet, and a relief valve for by-passing fluid thereacross from said outlet to said inlet to control the discharge pressure at said outlet, comprising: a piston movable with said relief valve for control thereof, a cylinder for movement of said piston therein, an expansible chamber formed by said cylinder and said piston for retaining a regulating pressure therein, said piston being responsive to said regulating pressure, conduit means for flowing fluid from said pump outlet to said chamber and from said chamber to said pump inlet, valve means in said conduit means, and means for controlling said valve means responsive to deviations of said discharge pressure from a predetermined value so that said valve means varies said regulating pressure in a discharge pressure decreasing or increasing sense, respectively, when the value of said discharge pressure exceeds or falls below said predetermined value, whereby said discharge pressure is maintained at said predetermined value.

11. Discharge pressure regulating apparatus for a fluid pump including an inlet thereto, a discharge outlet therefrom, an impeller for causing flow of fluid from said inlet to said outlet, and a relief valve for by-passing fluid thereacross from said outlet to said inlet to control the discharge pressure at said outlet, comprising: a piston movable with said relief valve for control thereof, a cylinder for movement of said piston therein, an expansible chamber formed by said cylinder and said piston for retaining a regulating pressure therein, said piston being responsive to said regulating pressure, conduit means for flowing fluid from said pump outlet to said chamber and from said chamber to said pump inlet, valve means in said conduit means for selectively permitting flow to and from said chamber and in said conduit means so that the value of said regulating pressure is thereby respectively increased or decreased, and means including a diaphragm and a spring to control said valve means, said diaphragm being responsive to said discharge pressure in opposition to said spring so that said valve means prevents said flow in said conduit means when the force produced by said discharge pressure on said diaphragm corresponds to a predetermined deflection of said spring.

12. Apparatus for regulating the discharge pressure at the outlet of a fluid pump, comprising: first and second conduit means for by-passing fluid from said outlet to the inlet of said pump, a relief valve in said first conduit means for controlling the flow therethru to vary said discharge pressure, a regulating pressure chamber having a movable wall connected to said relief valve for operation thereof in response to a regulating pressure in said chamber, valve means in said second conduit means and a connection for the flow of fluid between said valve means and said chamber for varying said regulating pressure, said valve means being responsive to said discharge pressure and having a neutral position in which said regulating pressure does not vary and being effective on movement in opposite directions from said neutral position to vary said regulating pressure in a sense to cause motion of said wall and hence said relief valve in corresponding opposite directions, whereby said discharge pressure is substantially constant regardless of the quantity of fluid being delivered by said pump.

13. Apparatus for regulating the discharge pressure at the outlet of a fluid pump, comprising: first and second conduit means for by-passing fluid from said outlet to the inlet of said pump, a relief valve in said first conduit means for controlling the flow therethru to vary said discharge pressure, a regulating pressure chamber having a movable wall connected to said relief valve for operation thereof in response to a regulating pressure in said chamber, said discharge pressure varying directly as said regulating pressure varies, valve means in said second conduit means and a connection for the flow of fluid between said valve means and said chamber for varying said regulating pressure, a diaphragm responsive to a control fluid pressure and to said discharge pressure for operation of said valve means; said valve means having a neutral position thereof in which said regulating pressure does not vary and being effective, when the value of said discharge pressure exceeds a predetermined value of said control pressure to permit the flow of fluid from said outlet to said chamber, thereby increasing the value of said regulating pressure; said valve means being similarly effective, when the value of said discharge pressure is less than said predetermined value of said control pressure, to permit the flow of fluid from said chamber to said pump inlet, thereby decreasing the value of said regulating pressure; whereby the value of said discharge pressure is maintained in definite, preselected relation to said control pressure value.

14. Apparatus for regulating the discharge pressure at the outlet of a fluid pump, comprising: a relief conduit for conveying fluid from the outlet to the inlet of said pump, a relief valve in said conduit for controlling the flow therethru to vary said discharge pressure, a regulating pressure chamber having a movable wall connected to said relief valve for operation thereof in reponse to a regulating pressure in said chamber, a first passage for supplying said chamber with fluid from the pump outlet, a second passage for conveying fluid from said chamber to said pump inlet, valve means for controlling the flow through said passages and having a neutral position in which both said passages are closed and variation of said regulating pressure is prevented, said valve means being effective upon movement in opposite directions from said neutral position to selectively open said passages so as to vary said regulating pressure in selectively opposite senses and to thereby move said relief valve in selectively opposite directions, and operating means for said valve means including a pair of expansible chambers separated by a movable wall, means for subjecting one of said expansible chambers to said pump discharge pressure, means in the other of said chambers for applying an opposing control force to said wall, said wall being effective when the differential between the opposing forces acting thereon has a predetermined value to position said valve means at said neutral position and when said differential departs from said value to move said valve means in a direction to cause a correcting movement of said relief valve, so that the discharge pressure is regulated as in a definite, preselected relation to said control force and independently of the relief valve position.

LEIGHTON LEE, II.

REFERENCES CITED

The following references are of record in the file of this patent:

UNITED STATES PATENTS

| Number | Name | Date |
|---|---|---|
| 2,170,530 | Johnson | Aug. 22, 1939 |
| 2,189,210 | Johnson | Feb. 6, 1940 |
| 2,263,091 | Johnson | Nov. 18, 1941 |
| 2,268,807 | Curtis | Jan. 6, 1942 |
| 2,299,079 | Davis | Oct. 20, 1942 |
| 2,368,883 | Roth | Feb. 6, 1945 |
| 2,375,076 | Caserta | May 1, 1945 |